(12) United States Patent
Mukherjee et al.

(10) Patent No.: US 12,470,778 B2
(45) Date of Patent: Nov. 11, 2025

(54) SYSTEM AND METHOD FOR IMPLICIT ITEM EMBEDDING WITHIN A SIMULATED ELECTRONIC ENVIRONMENT

(71) Applicant: BANK OF AMERICA CORPORATION, Charlotte, NC (US)

(72) Inventors: Maharaj Mukherjee, Poughkeepsie, NY (US); Prashant Thakur, Gujarat (IN); George Anthony Albero, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 53 days.

(21) Appl. No.: 18/138,919

(22) Filed: Apr. 25, 2023

(65) Prior Publication Data

US 2024/0364977 A1 Oct. 31, 2024

(51) Int. Cl.
| | |
|---|---|
| H04N 21/81 | (2011.01) |
| H04N 21/25 | (2011.01) |
| H04N 21/258 | (2011.01) |
| H04N 21/475 | (2011.01) |

(52) U.S. Cl.
CPC ......... *H04N 21/812* (2013.01); *H04N 21/251* (2013.01); *H04N 21/25891* (2013.01); *H04N 21/4756* (2013.01)

(58) Field of Classification Search
CPC ............... H04N 21/812; H04N 21/251; H04N 21/25891; H04N 21/4756
See application file for complete search history.

(56) References Cited

U.S. PATENT DOCUMENTS

| | | |
|---|---|---|
| 7,775,885 B2 | 8/2010 | Van Luchene et al. |
| 7,970,837 B2 | 6/2011 | Lyle et al. |
| 8,063,929 B2 | 11/2011 | Kurtz et al. |
| 8,112,490 B2 | 2/2012 | Upton et al. |
| 8,113,959 B2 | 2/2012 | De Judicibus |
| 8,149,241 B2 | 4/2012 | Do et al. |
| 8,154,578 B2 | 4/2012 | Kurtz et al. |
| 8,154,583 B2 | 4/2012 | Kurtz et al. |
| 8,159,519 B2 | 4/2012 | Kurtz et al. |

(Continued)

*Primary Examiner* — Sumaiya A Chowdhury
(74) *Attorney, Agent, or Firm* — Moore & Van Allen PLLC; Nicholas C. Russell

(57) ABSTRACT

Systems, computer program products, and methods are described herein for implicit item embedding within a simulated electronic environment. In various embodiments, the invention includes utilizing a hybrid recommendation engine, the invention suggests product placements based on user data and preferences of a specific user. During the initial warm-up period, either user-based or product-based collaborative filtering is applied to assign the user to a collaborative user group until more information about the user becomes available. The hybrid recommendation engine is enhanced through a collaborative clustering component, which involves assigning the user to the collaborative user group via user-based collaborative filtering based on their similar user characteristics, product interests, or product preferences. The invention dynamically alters digital content streamed to the user's device. An implicit product placement module integrates recommended products within the entertainment content, providing a seamless and personalized experience for the user.

17 Claims, 5 Drawing Sheets

(56) References Cited

U.S. PATENT DOCUMENTS

| | | |
|---|---|---|
| 8,237,771 B2 | 8/2012 | Kurtz et al. |
| 8,274,544 B2 | 9/2012 | Kurtz et al. |
| 8,379,968 B2 | 2/2013 | Do et al. |
| 8,386,918 B2 | 2/2013 | Do et al. |
| 8,458,603 B2 | 6/2013 | Finn et al. |
| 9,466,278 B2 | 10/2016 | Rosedale et al. |
| 9,875,580 B2 | 1/2018 | Cannon et al. |
| 10,878,177 B2 | 12/2020 | Andriotis et al. |
| 10,917,445 B2 | 2/2021 | Andon et al. |
| 11,235,530 B2 | 2/2022 | Kaltenbach et al. |
| 11,282,139 B1 | 3/2022 | Winklevoss et al. |
| 2009/0298514 A1* | 12/2009 | Ullah ............... G06Q 30/02 340/572.1 |
| 2011/0307478 A1* | 12/2011 | Pinckney ............ G09B 7/04 707/724 |
| 2015/0264416 A1* | 9/2015 | Heinz, II ........ H04N 21/23412 725/34 |
| 2017/0259167 A1 | 9/2017 | Cook et al. |
| 2022/0248955 A1 | 8/2022 | Tran |
| 2022/0351021 A1* | 11/2022 | Biswas ............. G06N 3/0464 |
| 2023/0004676 A1 | 1/2023 | Falchuk et al. |

\* cited by examiner

SYSTEM AND METHOD FOR IMPLICIT ITEM EMBEDDING WITHIN A SIMULATED ELECTRONIC ENVIRONMENT

TECHNOLOGICAL FIELD

The present invention relates generally to a method and system for increasing the scope of product cataloging and description in visual media while minimizing disruption to the viewer's experience.

BACKGROUND

In recent years, product placement within visual media such as movies, television shows, and video content has become more explicit and pervasive. This form of advertising often detracts from the viewer's enjoyment and diverts their attention from the storyline. Additionally, the scope of product cataloging and description provided to customers is often limited, resulting in missed opportunities for both advertisers and consumers. Therefore, there exists a need for a method and system to address these challenges while maintaining an enjoyable viewing experience for the viewer.

Applicant has identified a number of deficiencies and problems associated with implicit item embedding within a simulated electronic environment. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for implicit item embedding within a simulated electronic environment.

The present invention is directed to a method and system for enabling implicit product placement and interactive user engagement within visual media content. The system may include components such as a natural language processing (NLP) search module, an implicit product placement engine, a user interaction module, and a product catalog database.

In one aspect, the NLP search module may allow users to engage with a chatbot or similar interface to search for specific products featured in the visual media content. This search may be conducted during or after the viewing experience and may provide information on product availability through online retailers or physical stores.

In another aspect, the implicit product placement engine may index items within the video or metaverse environment to products in the catalog without drawing explicit attention to the products, thereby preserving the visual pleasure for the viewer.

In yet another aspect, the user interaction module may enable the viewer to pause or stop the visual media content, causing items from the scene to become more prominent, display information, and present a QR code or similar identifier. This identifier may direct the user to a store or vendor offering the product or a similar alternative. In a further aspect, the product catalog database may provide extensive product cataloging and search capabilities, allowing users to discover products without explicit placement in the visual media content.

By employing the method and system disclosed herein, advertisers can offer a more engaging and non-intrusive product placement experience while expanding product search and online retailing opportunities. In one aspect, the content analyzer may analyze visual media content to identify scenes, objects, and characters, as well as relevant contextual information. This analysis may then be used to determine optimal product placements and descriptions within the content.

In another aspect, the product catalog database may store a wide variety of products, brands, and descriptions, allowing for an increased scope of product cataloging. In yet another aspect, the product placement engine may use the information from the content analyzer and the product catalog database to intelligently place products in a manner that minimizes distraction from the storyline while increasing the visibility of the products. In a further aspect, the user interface module may provide an interactive experience for viewers, enabling them to access additional information about the products featured in the visual media without disrupting their viewing experience.

By employing the method and system disclosed herein, the scope of product cataloging and description can be increased, providing a more comprehensive and targeted advertising solution while minimizing disruption to the viewer's experience. The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
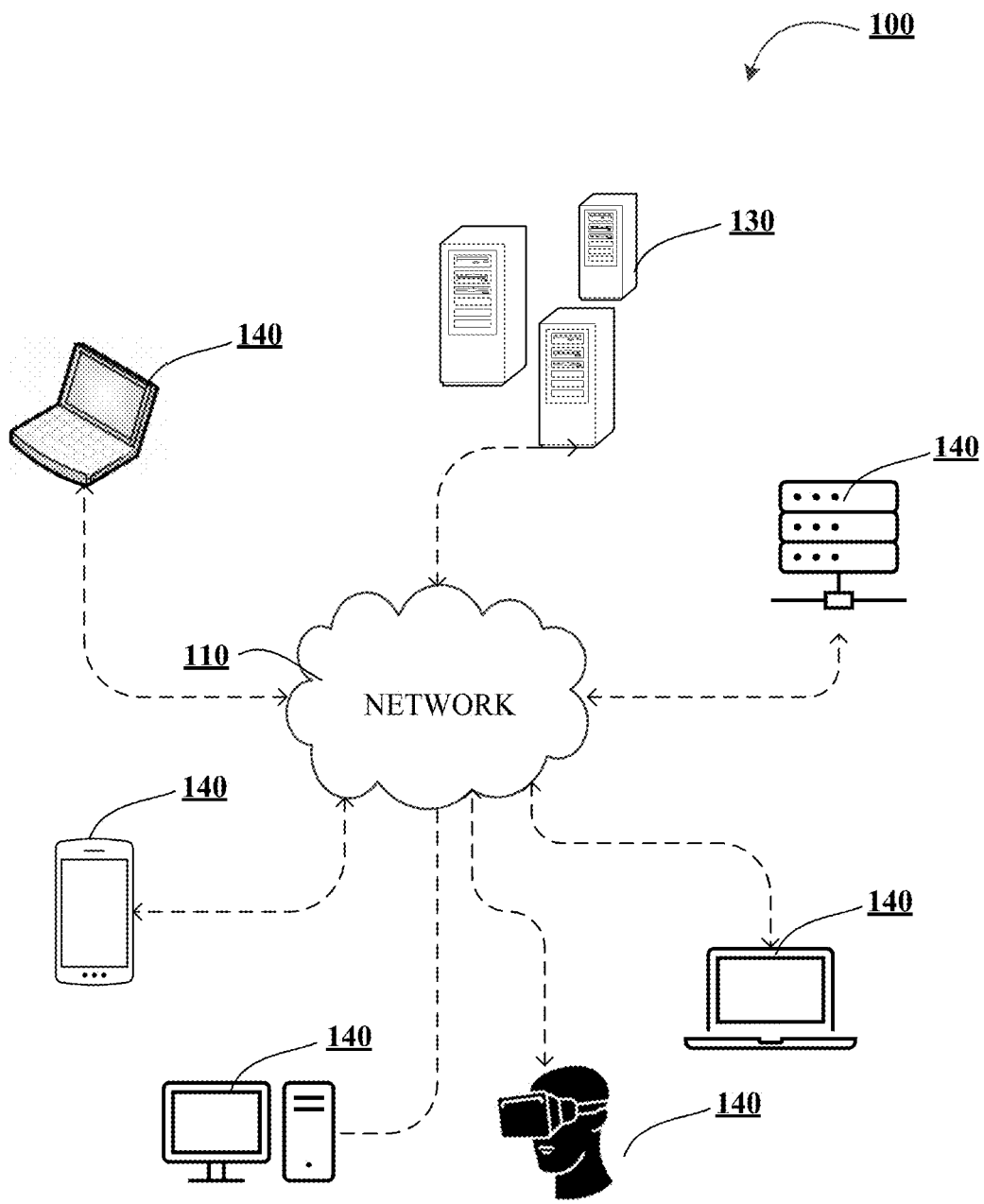
Figure 1B:
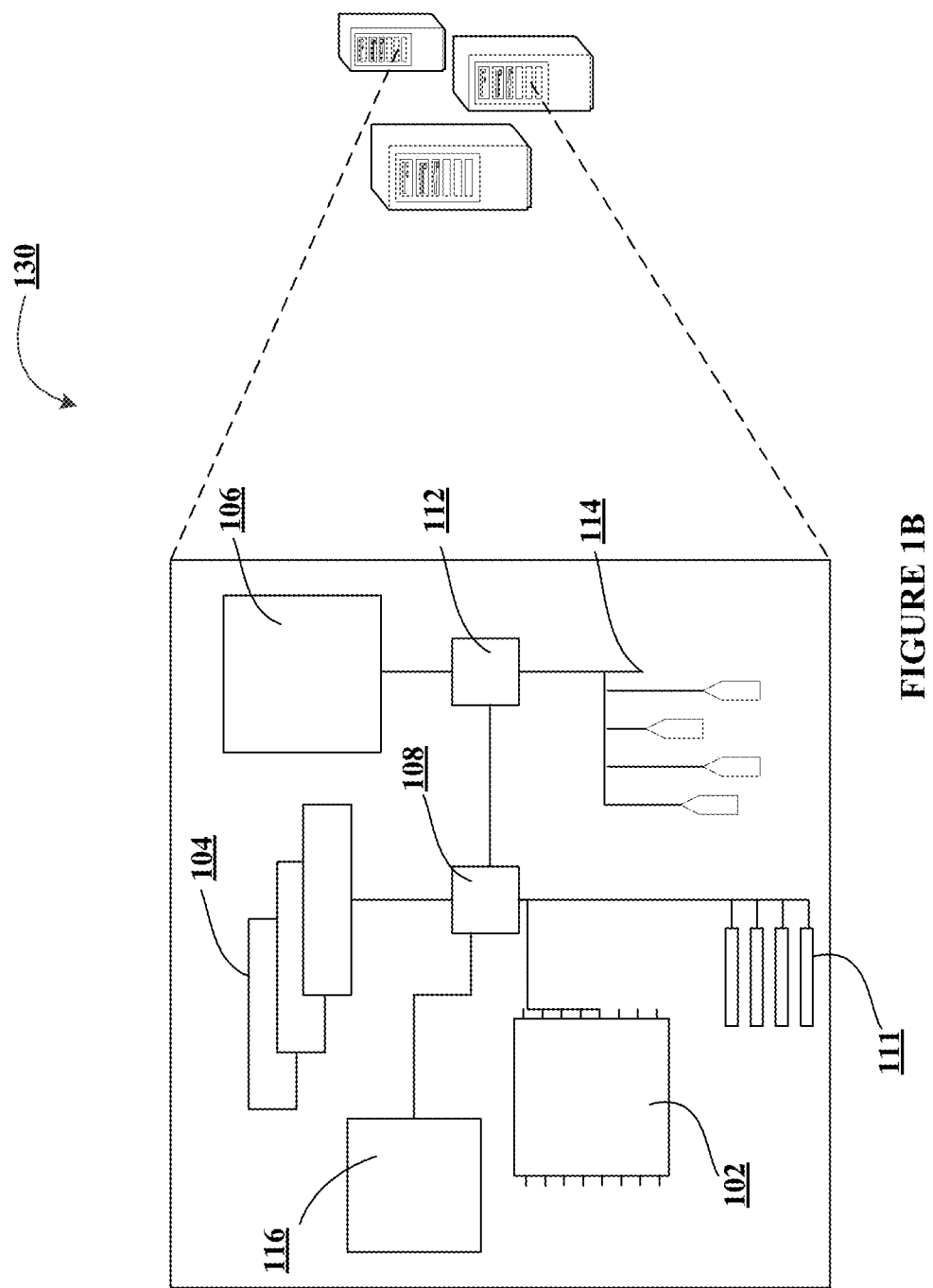
Figure 1C:
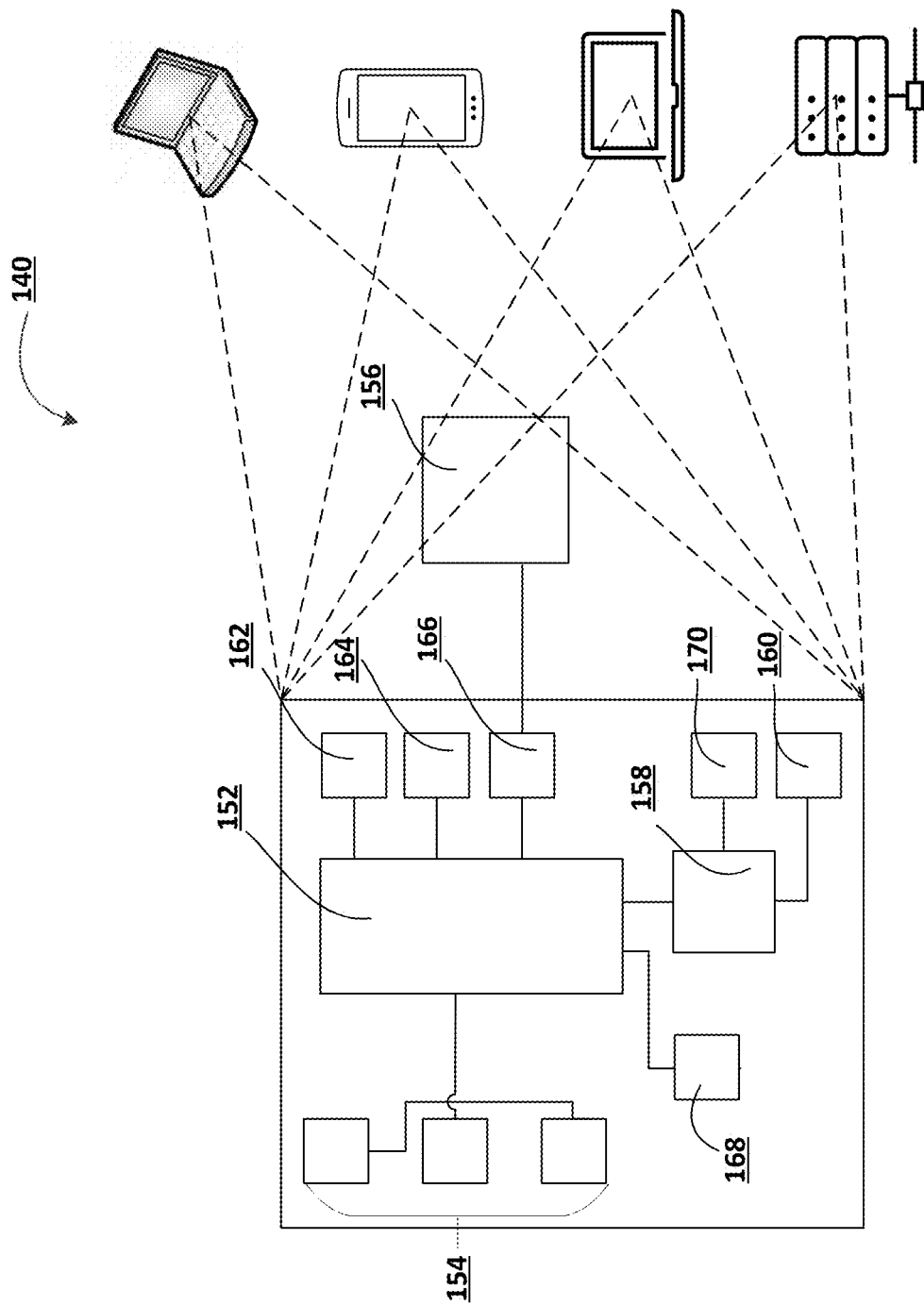
Figure 2:
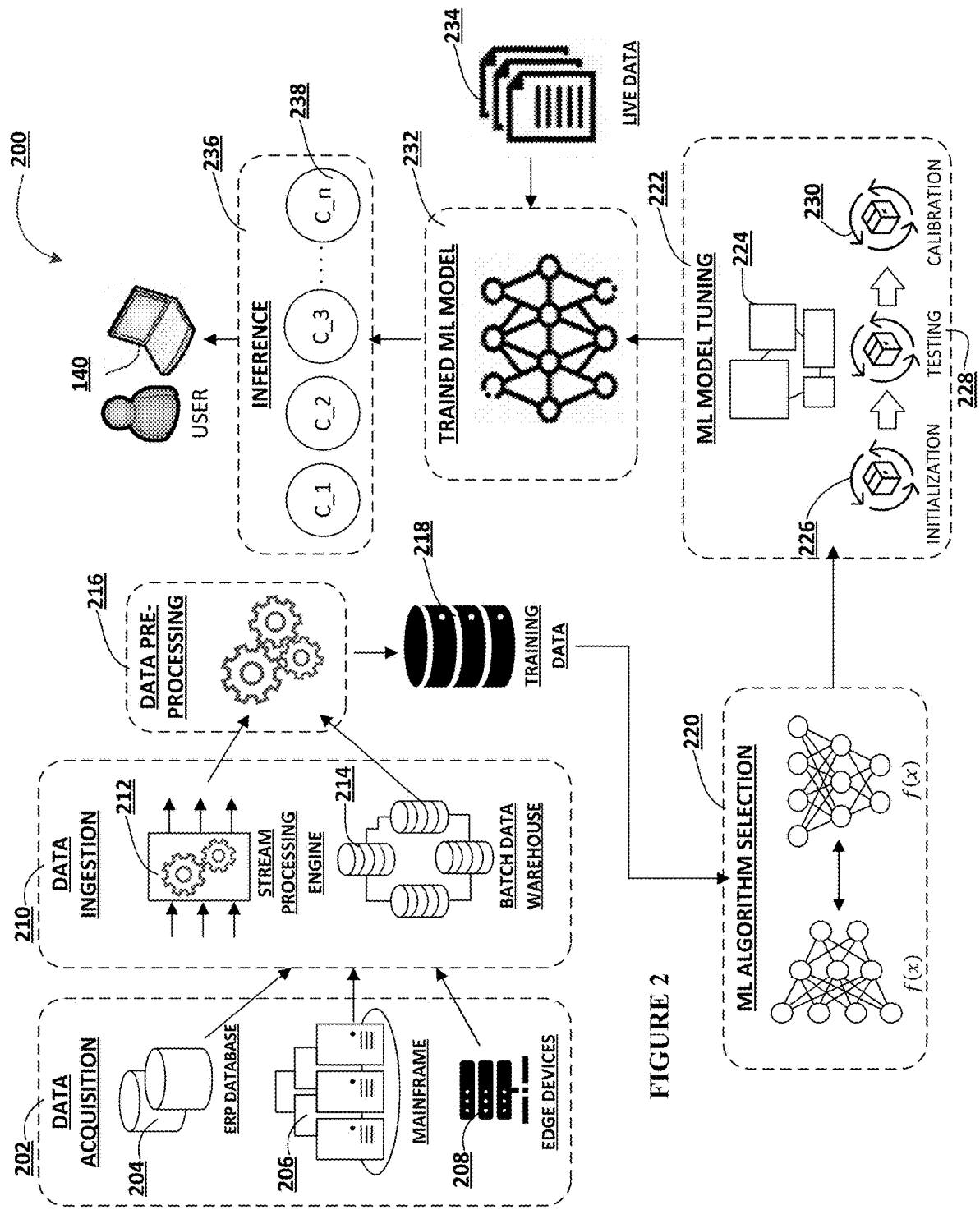
Figure 3:
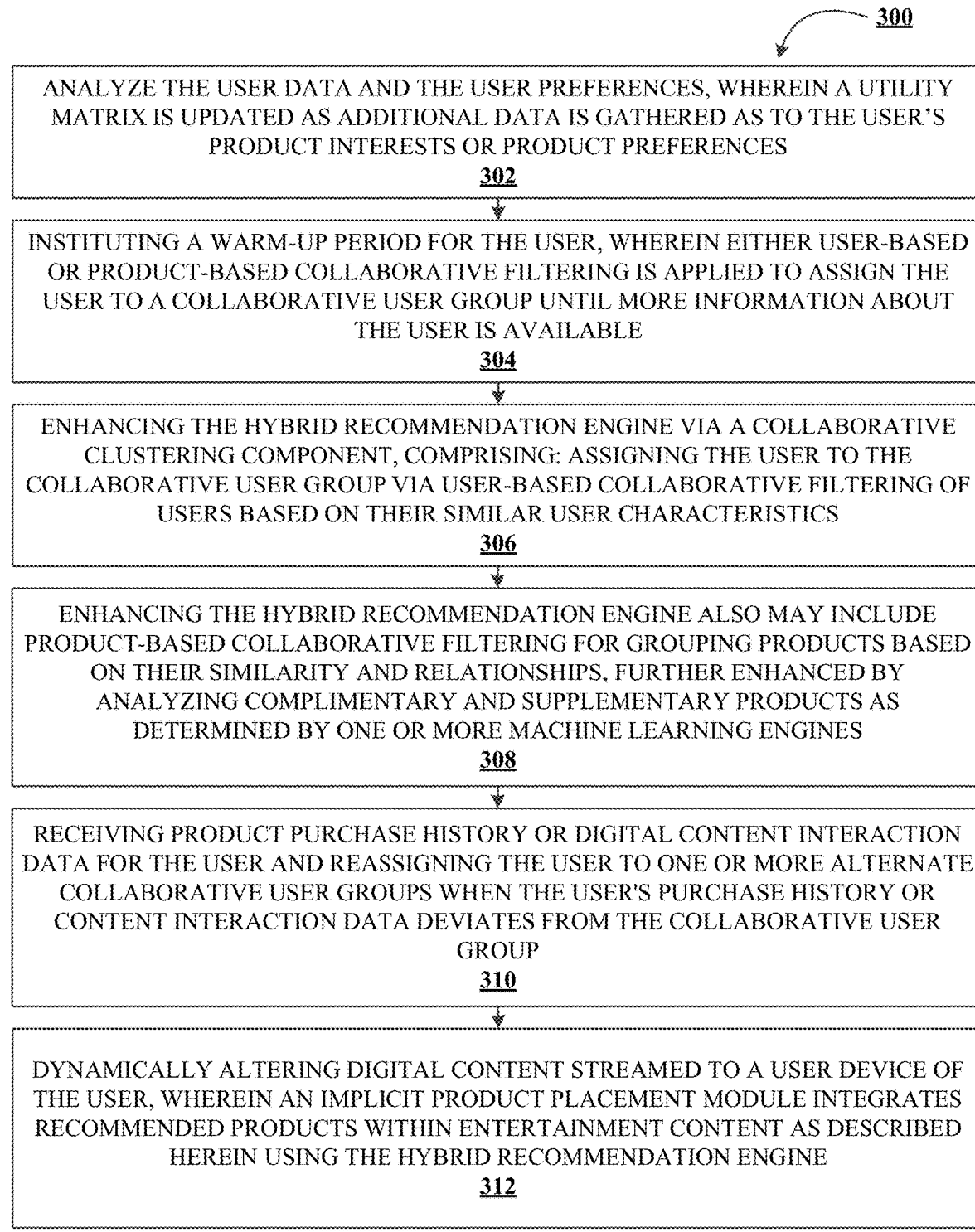

FIGS. 1A-1C illustrates technical components of an exemplary distributed computing environment for implicit item embedding within a simulated electronic environment, in accordance with an embodiment of the disclosure;

FIG. 2 illustrates an exemplary machine learning (ML) subsystem architecture 200, in accordance with an embodiment of the invention; and FIG. 3 illustrates a process flow for implicit item embedding within a simulated electronic environment, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general purpose system into a specific purpose computing system.

As used herein, "machine learning" may refer to a subset of artificial intelligence that focuses on the development of algorithms, models, or systems capable of learning from and making predictions or decisions based on data. In some embodiments, machine learning may involve the use of statistical techniques, pattern recognition, or computational intelligence to create models that can adapt and improve over time. In one aspect, machine learning may encompass various methods, such as supervised learning, unsupervised learning, reinforcement learning, and deep learning, among others. The specific components of a machine learning system may vary based on the needs of the particular application or task. In some embodiments, machine learning may be configured to process, analyze, and learn from large volumes of structured or unstructured data, which may then be used to optimize the performance or accuracy of specific operational aspects of the system. Machine learning may be implemented within any general-purpose computing system, and in doing so, may execute embedded source code to control specific features of the general-purpose system, thereby transforming the general-purpose system into a specific-purpose computing system designed for machine learning tasks.

As used herein, a "machine learning engine" may refer to the core elements of an application or part of an application that serves as a foundation for a larger piece of software and drives the functionality of machine learning tasks within the software. In some embodiments, a machine learning engine may be self-contained but externally-controllable code that encapsulates powerful logic designed to perform or execute machine learning operations. In one aspect, a machine learning engine may be underlying source code that establishes file hierarchy, input and output methods, and how the machine learning component of an application interacts or communicates with other software and/or hardware. The specific components of a machine learning engine may vary based on the needs of the specific application as part of the larger piece of software. In some embodiments, a machine learning engine may be configured to retrieve resources created in other applications, which may then be ported into the engine for use during specific operational aspects of the engine. A machine learning engine may be configurable to be implemented within any general-purpose computing system. In doing so, the machine learning engine may be configured to execute source code embedded therein to control specific features of the general-purpose computing system to execute machine learning operations, thereby transforming the general-purpose system into a specific-purpose computing system designed for machine learning tasks.

As used herein, a "metaverse" may refer to a virtual or digital environment that serves as a foundation for a larger interconnected system, hosting multiple applications and users within a shared, immersive, and interactive space. In some embodiments, a metaverse may be self-contained but externally-accessible, encompassing powerful logic designed to support various types of activities, such as communication, entertainment, education, and commerce. In one aspect, a metaverse may be built upon underlying source code that establishes the structure, input and output methods, and how the different components of the metaverse interact or communicate with other software and/or hardware. The specific components of a metaverse may vary based on the needs of the specific applications and user experiences as part of the larger interconnected system. In some embodiments, a metaverse may be configured to retrieve resources created in other applications, which may then be ported into the metaverse for use during specific operational aspects of the environment. A metaverse may be configurable to be implemented within any general-purpose computing system. In doing so, the metaverse may be configured to execute source code embedded therein to control specific features of the general-purpose computing system to support various activities and interactions, thereby transforming the general-purpose system into a specific-purpose computing system designed for immersive and interconnected experiences.

As used herein, "extended reality" (XR) refers to a collective term encompassing a spectrum of immersive technologies that merge the physical and virtual worlds, providing users with interactive and multisensory experiences. XR includes virtual reality (VR), which fully immerses users in computer-generated environments; augmented reality (AR), which overlays digital information, graphics, or objects onto the user's view of the real world; and mixed reality (MR), which combines elements of VR and AR, allowing users to interact with both virtual and physical objects simultaneously. Extended reality technologies utilize a range of hardware, such as headsets, glasses, or displays, as well as software applications and platforms, to create immersive experiences for various purposes, including entertainment, education, training, communication, and entertainment.

As used herein, "augmented reality" (AR) may refer to a technology that overlays digital information, such as text, images, 3D models, or animations, onto a user's view of the real world, thereby creating an interactive and immersive experience that seamlessly integrates virtual elements with the physical environment. Augmented reality can be experienced through various devices, such as smartphones, tablets, smart glasses, or head-mounted displays, which utilize cameras, sensors, and displays to capture, process, and present digital content in real-time. In some embodiments, augmented reality systems may be self-contained but externally-accessible, encompassing powerful logic designed to support various types of activities, such as navigation, education, entertainment, and industrial applications. In one aspect, an augmented reality system may be built upon underlying source code that establishes the structure, input and output methods, and how the different components of the system interact or communicate with other software and/or hardware. The specific components of an augmented reality system may vary based on the needs of the specific applications and user experiences as part of the larger interconnected system. In some embodiments, an augmented reality system may be configured to retrieve resources created in other applications, which may then be ported into the system for use during specific operational aspects of the environment.

As used herein, a "virtual reality device" (VR device) is an electronic apparatus that allows users to experience and interact with a computer-generated, three-dimensional environment, providing a sensory experience that mimics real-world scenarios. These devices can be standalone headsets or rely on external hardware such as entertainment consoles, personal computers, or smartphones for processing and display purposes. Examples of virtual reality devices include standalone headsets with integrated displays and processing units, headsets designed for use with entertainment consoles, PC-powered VR systems that employ external sensors for precise tracking, smartphone-based VR solutions using the phone's display and processing capabilities, and affordable entry-level VR viewers that utilize a simple cardboard structure and lenses in combination with a smartphone. High-resolution VR headsets with ultra-wide fields of view and advanced finger-tracking controllers are also contemplated, offering a more immersive experience for users.

As used herein "digital video content" refers to audiovisual media created, stored, and distributed in digital formats, which can be accessed and viewed on various end point devices. This type of content encompasses a wide range of formats and genres, including on-demand movies, TV shows, documentaries, user-generated videos, short-form social media clips, live streaming events, educational materials, news broadcasts, web series, virtual reality and 360-degree videos, and animated content. Digital video content can be found on online streaming platforms, video-sharing websites, social media networks, and other digital distribution channels, catering to diverse audiences and purposes.

As used herein, "implicit product placement" includes a subtle form of marketing strategy in which branded goods or services are incorporated into a form of entertainment, such as movies, television shows, music videos, or the like, without explicitly drawing attention to the brand or product. The intention is to create a subtle presence of the product within the content, allowing it to blend seamlessly into the narrative or scene. This type of product placement generates brand awareness and influences user behavior by creating a subconscious association between the brand and the content, without making the promotion feel overt or intrusive to the audience.

As used herein, "customized content" refers to the tailored creation and delivery of media or information to meet the specific needs, preferences, or interests of individual users or target audiences, based on factors such as behavioral data, browsing history, and user interactions. The objective of customized content is to enhance user engagement, satisfaction, and loyalty by offering a more relevant and meaningful experience through various formats, including video content, social media posts, advertisements, or the like. This personalization can be achieved using algorithms, machine learning, and user-generated input to analyze and predict user preferences and deliver or customize content in real time that aligns with those preferences.

As used herein, a "QR code" (Quick Response code) refers to a two-dimensional matrix barcode designed for rapid and efficient encoding and decoding of data using optical scanning devices, such as smartphones, tablets, or dedicated barcode scanners. The QR code consists of an arrangement of black square modules on a white background, which can store a variety of information types, including text, website URLs, contact information, or geographical coordinates. The purpose of a QR code is to facilitate the easy and swift transfer of information when scanned, enabling users to access the encoded data without the need for manual input, thereby streamlining and enhancing user experience across various applications, such as product identification, inventory management, marketing, and contactless transactions.

As used herein, a "3D model" may refer to a digital representation of a physical object or environment that serves as a foundation for creating realistic, three-dimensional visualizations within various applications, such as computer graphics, virtual reality, and entertainment. In some embodiments, a 3D model may be self-contained but externally-accessible, encompassing powerful logic designed to support various types of activities, such as rendering, animation, and simulation. In one aspect, a 3D model may be built upon underlying source code that establishes the structure, input and output methods, and how the different components of the 3D model interact or communicate with other software and/or hardware. The specific components of a 3D model may vary based on the needs of the specific applications and user experiences as part of the larger interconnected system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "payment instrument" may refer to an electronic payment vehicle, such as an electronic credit or debit card. The payment instrument may not be a "card" at all and may instead be account identifying information stored electronically in a user device, such as payment credentials or tokens/aliases associated with a digital wallet, or account identifiers stored by a mobile application.

It is understood that machine learning can be utilized to personalize video content or replace specific items within a video with other items by employing algorithms and techniques that analyze user preferences, behavior, and context, as well as recognize and manipulate the elements within the video. Personalization is a key aspect of this process. Machine learning models can analyze a user's viewing history, interactions, preferences, and other relevant data to identify patterns and predict the type of content that would most likely appeal to the individual. Based on this analysis, a personalized video playlist, recommendations, or targeted advertisements can be curated to enhance user engagement and satisfaction.

Content-aware item replacement is another application of machine learning in this context. Deep learning techniques, such as object detection and segmentation, can be employed to identify and isolate specific items or elements within a video. Once the items are recognized, they can be replaced with other items or content that align with the user's preferences or the intended message. For example, a product placement within a video can be tailored to display different brands or products for different viewers based on their interests or other user information.

Context-aware item replacement involves machine learning models that analyze the context of the video, such as time, location, or user-specific information, and dynamically replace items within the video based on this contextual information. For example, a video showing a billboard advertisement in the background could be replaced with a contextually relevant ad based on the viewer's location or the time of day.

Style transfer is another technique that can be employed. Machine learning techniques, such as generative adversarial networks (GANs), can be used to modify the appearance or style of certain elements within a video, making them more appealing or relevant to the target audience. This could involve altering the color palette, visual style, or even the overall aesthetic of a video to match the viewer's preferences.

Overall, machine learning offers immense potential for personalizing video content and replacing specific items within a video with other items, enabling the creation of tailored experiences that cater to individual users or target audiences, ultimately enhancing user engagement and satisfaction.

One of ordinary skill in the art will understand that product placement within visual media such as movies, television shows, and video content has become more pervasive. This form of advertising often detracts from the viewer's enjoyment and diverts their attention from the storyline. Additionally, the scope of product cataloging and description provided to users is often limited, resulting in missed opportunities for both entities and consumers. Therefore, as stated, a need exists for a method and system to address these challenges while maintaining an enjoyable viewing experience for the viewer.

Systems, methods, and computer program products are provided for implicit item embedding within a simulated electronic environment. The present invention is directed to a method and system for enabling implicit product placement and interactive user engagement within visual media content. The system may include components such as a natural language processing (NLP) search module, an implicit product placement engine, a user interaction module, and a product catalog database.

In one aspect, the NLP search module may allow users to engage with a chatbot or similar inter-face to search for specific products featured in the visual media content. This search may be conducted during or after the viewing experience and may provide information on product availability through online retailers or physical stores.

In another aspect, the implicit product placement engine may index items within the video or metaverse environment to products in the catalog without drawing explicit attention to the products, thereby preserving the visual pleasure for the viewer.

In yet another aspect, the user interaction module may enable the viewer to pause or stop the visual media content, causing items from the scene to become more prominent, display information, and present a QR code or similar identifier. This identifier may direct the user to a store or vendor offering the product or a similar alternative. In a further aspect, the product catalog database may provide extensive product cataloging and search capabilities, allowing users to discover products without explicit placement in the visual media content.

By employing the method and system disclosed herein, advertisers can offer a more engaging and non-intrusive product placement experience while expanding product search and online retailing opportunities. In one aspect, the content analyzer may analyze visual media content to identify scenes, objects, and characters, as well as relevant contextual information. This analysis may then be used to determine optimal product placements and descriptions within the content.

In another aspect, the product catalog database may store a wide variety of products, brands, and descriptions, allowing for an increased scope of product cataloging. In yet another aspect, the product placement engine may use the information from the content analyzer and the product catalog database to intelligently place products in a manner that minimizes distraction from the storyline while increasing the visibility of the products. In a further aspect, the user interface module may provide an interactive experience for viewers, enabling them to access additional information about the products featured in the visual media without disrupting their viewing experience.

Accordingly, the present disclosure comprises a hybrid recommendation engine that is employed for suggested product placement, utilizing content-based filtering based on a utility matrix created from user data and preferences. However, since utility matrices can be incomplete and error-prone, collaborative clustering is also incorporated into the recommendation engine. This approach includes both user-based and product-based collaborative filtering. User-based filtering groups users with similar characteristics and tastes, while product-based filtering groups products based on their similarity and relationships, with further enhancement by considering complimentary and supplementary products.

As users express more interest in a product or type of product, this data can be incorporated into a utility matrix for improved content-based filtering. If a user's purchase history deviates from a known collaborative group of users, the user in question may be placed into other more apt groups. For new users with limited data, collaborative filtering can be employed during a warm-up period until more information about the user is available.

The present invention may enhance the core operations of an entity in at least two ways. First, it uses recommendation engines to predict customer needs for financial and banking products, and by implicitly integrating these products within movies and entertainment, it enhances the information accessibility for users. Second, by assisting third party entities in presenting products such as houses, automobiles, furniture, and appliances, or the like, the invention not only supports the third parties' operations, but also facilitates the expansion of entity offerings in home, auto, and consumer resource offerings, as well as other resource instrument offerings (e.g., various financing offers, or the like).

Implicit product placements within entertainment minimize distraction, contrasting with explicit placements that may be disruptive. Additionally, the invention can incorporate an avatar or likeness of the user within specific digital video content, further enabling them to visualize themselves interacting with or utilizing the product within the entertainment context (e.g., driving an iconic vehicle or donning a tuxedo in a dramatic casino scene).

What is more, the present disclosure provides a technical solution to a technical problem. As described herein, the technical problem includes difficulty in customizing viewable content on a per-user basis that remains entertaining and appealing to the user but also offers increased effectiveness in product placement, user customization, as well as ease of access to products that the user may be interested in learning more about. The technical solution presented herein allows for intelligent approaches to customizing content in an automated manner, an intuitive interface for user education on one or more products, and increased effectiveness of product placement via immersive and seamless integration. In particular, the present system is an improvement over existing solutions to the difficulties of seamless and customized implicit product placement, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment 100 for implicit item embedding within a simulated electronic environment, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned. The end-point device(s) 140 may represent various forms of electronic devices, including user input devices such as personal digital assistants, televisions, monitors, cellular telephones, smartphones, laptops, desktops, extended reality devices, augmented reality devices, virtual reality devices, and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. It is understood that machine learning can be utilized to personalize video content or replace specific items within a video with other items by employing algorithms and techniques that analyze user preferences, behavior, and context, as well as recognize and manipulate the elements within the video. Personalization is a key aspect of this process. Machine learning models can analyze a user's viewing history, interactions, preferences, and other relevant data to identify patterns and predict the type of content that would most likely appeal to the individual. Based on this analysis, a personalized video playlist, recommendations, or targeted advertisements can be curated to enhance user engagement and satisfaction.

Content-aware item replacement is another application of machine learning in this context. Deep learning techniques, such as object detection and segmentation, can be employed to identify and isolate specific items or elements within a video. Once the items are recognized, they can be replaced with other items or content that align with the user's preferences or the intended message. For example, a product placement within a video can be tailored to display different brands or products for different viewers based on their interests or characteristic information.

Context-aware item replacement involves machine learning models that analyze the context of the video, such as time, location, or user-specific information, and dynamically replace items within the video based on this contextual information. For example, a video showing a billboard advertisement in the background could be replaced with a contextually relevant ad based on the viewer's location or the time of day.

Style transfer is another technique that can be employed. Machine learning techniques, such as generative adversarial networks (GANs), can be used to modify the appearance or style of certain elements within a video, making them more appealing or relevant to the target audience. This could involve altering the color palette, visual style, or even the overall aesthetic of a video to match the viewer's preferences. Overall, machine learning offers immense potential for personalizing video content and replacing specific items within a video with other items, enabling the creation of tailored experiences that cater to individual users or target audiences, ultimately enhancing user engagement and satisfaction.

The machine learning subsystem 200 may include a data acquisition engine 202, data ingestion engine 210, data pre-processing engine 216, ML model tuning engine 222, and inference engine 236. The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. In some embodiments, the ML model tuning engine 222 may be referred to as a "hybrid recommendation engine," designed to learn user preferences or interests, recommend products in line with those product preferences or interests, as well as dynamically analyze and alter digital video content in order to implicitly place products within the digital video content.

To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., C_1, C_2 . . . C_n 238) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow for implicit item embedding within a simulated electronic environment, in accordance with an embodiment of the disclosure. As shown in block 301, the process includes utilizing a hybrid recommendation engine to suggest product placements based on user data and user preferences of a user. In some embodiments, these suggestions may be forwarded to a third party such that they may be integrated in digital video content (e.g., integrated by an entertainment studio, video production algorithm, or the like of a content provider). In other embodiments, suggesting product placements may comprise actually digitally embedding one or more product representations in digital content forwarded to the user in real time. For instance, the system may receive digital video content to be forwarded to a user, and may make alterations or changes to the digital video content before it is sent to a user device of the user.

One of ordinary skill in the art will understand that a neural network can be used to replace an object in a video with another object by employing a combination of deep learning techniques, such as object detection, segmentation, and generative models. In the first stage, object detection and localization, a neural network such as a Convolutional Neural Network (CNN) or a variant like YOLO (You Only Look Once) or SSD (Single Shot MultiBox Detector) is used to identify the presence of the target object and its location within each frame of the video. The neural network scans the frames and outputs the object's bounding boxes and class probabilities.

Next, segmentation is performed. Once the object is detected and localized, a segmentation model like Mask R-CNN or U-Net is used to isolate the object from the background. This step generates a detailed object mask that distinguishes the object's pixels from the surrounding pixels. Segmentation allows for more precise object replacement without affecting the background.

With the target object accurately detected and segmented, the neural network proceeds to the object replacement stage. This can be achieved using generative models like Variational Autoencoders (VAEs) or Generative Adversarial Networks (GANs). These models learn the distribution of the new object's appearance and can generate a realistic instance of it. The generated object is then integrated into the scene, replacing the original object while maintaining the original object's position, scale, and orientation. After the new object is inserted into the scene, blending and refinement are applied as post-processing techniques to seamlessly integrate the new object with the existing background and lighting conditions. This step may involve color and illumination adjustments, as well as edge refinement, to ensure that the new object appears natural and realistic within the video. Lastly, the entire process is repeated for each frame of the video, ensuring the object is replaced consistently throughout the video sequence. Depending on the complexity of the scene and the movements of the objects, optical flow or other motion estimation techniques may be applied to maintain spatial and temporal coherence. By following these steps, a neural network, such as the hybrid recommendation engine of the present invention, can effectively replace an object in a video with another object, resulting in a realistic and visually consistent output.

As indicated in block 302, a content-based filtering component may be utilized by the invention to analyze the user data and the user preferences, wherein a utility matrix is updated as additional data is gathered as to the user's product interests or product preferences. Content-based filtering is a recommendation approach that leverages user data and preferences to suggest items that are similar to the ones the user has shown interest in or engaged with. In the context of the described invention, a content-based filtering component may be utilized to analyze user data and preferences, updating a utility matrix as more information about the user's product interests or preferences is gathered. This might include steps such as feature extraction, wherein the content-based filtering component first analyzes the available items (products, content, or the like) and extracts their relevant features, such as genre, brand, price, or user ratings. This process results in a structured representation of each item in terms of its features. In some embodiments, the process of content-based filtering might also include creating one or more user categorizations based on the user's historical data, such as their browsing history, past purchases, or explicitly provided preferences. The user categorization represents the user's preferences and interests in terms of the same features used to describe the items. The utility matrix is constructed to represent the relationships between users and items. Each entry in the matrix corresponds to a user-item pair and contains a score or rating that indicates the user's preference for that particular item. In some embodiments, the utility matrix may initially be sparse, as it is unlikely that a user has interacted with all available items.

As the user expresses more interest in a product or a type of product, either by purchasing it or browsing it, this additional data is used to update the utility matrix. The updated matrix better reflects the user's current interests and preferences, improving the accuracy of content-based filtering. Using the user categorization and the utility matrix, the content-based filtering component calculates the similarity between items and the user's preferences. Items with a high degree of similarity to the user's interests are recommended, ensuring that the suggestions are personalized and relevant to the user. By continually updating the utility matrix as additional data on the user's product interests or preferences is gathered, the content-based filtering component of the invention can dynamically adapt to the user's evolving interests, providing increasingly personalized and accurate recommendations.

As shown in block 304, the process also includes instituting a warm-up period for the user, wherein either user-based or product-based collaborative filtering is applied to assign the user to a collaborative user group until more information about the user is available. Further shown in block 306, the process also includes enhancing the hybrid recommendation engine via a collaborative clustering component, comprising: assigning the user to the collaborative user group via user-based collaborative filtering of users based on their similar user characteristics, product interests, or product preferences. First, user similarity is computed based on user characteristics such as browsing history, past purchases, and explicit preferences, using various similarity measures like cosine similarity or Pearson correlation. Collaborative user groups are then formed based on these computed similarity scores, employing clustering techniques such as k-means, hierarchical clustering, or DBSCAN (Density-Based Spatial Clustering of Applications with Noise). DBSCAN is a clustering algorithm used in data mining and machine learning that groups data points based on their density while identifying noise or outlier points not belonging to any cluster.

As an unsupervised learning method, DBSCAN does not require the number of clusters to be pre-specified, determining the optimal number of clusters based on the data. The algorithm defines a neighborhood around each data point, calculating the density of points within that neighborhood. Two main parameters control the clustering process: epsilon (eps) and minimum points (MinPts). Epsilon defines the radius of the neighborhood around each data point, considering two data points as neighbors if their distance is less than or equal to epsilon. Minimum points represent the minimum number of data points required to form a dense region or cluster. DBSCAN categorizes data points as core points, border points, or noise points. Core points have at least MinPts number of points within their epsilon-neighborhood, border points lie within the epsilon-neighborhood of a core point but are not core points themselves, and noise points are neither core nor border points. The algorithm starts with an arbitrary data point, checks if it is a core point, and if so, recursively explores its neighbors and their neighbors, forming a cluster of connected core points. This process continues until all data points are either assigned to a cluster or identified as noise. DBSCAN is effective for datasets with varying densities and complex shapes, and it is robust to noise and outliers, making it suitable for a wide range of real-world applications.

When generating recommendations for a specific user, the collaborative filtering component identifies the user's collaborative user group. By leveraging the preferences and historical interactions of other users within the group, the engine can predict items that the specific user may be interested in. In some embodiments, this is done by calculating a weighted average of the preferences or ratings given by the users in the collaborative group for each item, with the weights determined by the similarity between the specific user and the other users in the group.

The hybrid recommendation engine ranks the items based on the predicted preference scores calculated in the previous step, and the top-N items with the highest scores are recommended to the specific user. This hybrid approach, which combines user-based collaborative filtering with content-based filtering, helps overcome the limitations of each individual method, resulting in improved recommendation accuracy and user satisfaction. The invention may also include an extension module configured to assist third parties in presenting products by providing application programming interface (API) access to the hybrid recommendation engine to input one or more new products, digital files, or the like, for implicit product placement.

As shown in block 308, enhancing the hybrid recommendation engine also may include product-based collaborative filtering for grouping products based on their similarity and relationships, further enhanced by analyzing complimentary and supplementary products as determined by one or more machine learning engines. Enhancing the hybrid recommendation engine may involve incorporating product-based collaborative filtering, which groups products based on their similarity and relationships. This approach is further improved by analyzing complimentary and supplementary products using one or more machine learning engines.

Product-based collaborative filtering works by calculating the similarity between products based on the user interactions or metadata associated with the products. Similarity measures, such as cosine similarity or Pearson correlation, are used to determine how closely related two products are based on users' preferences or product features. Once the product similarity is computed, products can be grouped into clusters, employing techniques like k-means, hierarchical clustering, or DBSCAN.

The recommendation engine can further enhance the product-based collaborative filtering by considering complimentary and supplementary products. Complimentary products are those that are similar or related but unlikely to be purchased together, such as competing brands or product alternatives. Identifying these relationships helps to avoid recommending products that the user is less likely to purchase. On the other hand, supplementary products are those that complement each other and are often used or purchased together, such as a suit and neckwear. Recognizing these relationships allows the recommendation engine to suggest products that users are more likely to need or find useful.

By incorporating both user-based and product-based collaborative filtering, along with the analysis of complimentary and supplementary products, the hybrid recommendation engine can generate more accurate and personalized recommendations for users. This approach helps to overcome the limitations of individual methods, resulting in improved user satisfaction and engagement with the recommended products.

Further illustrated in FIG. 3, at block 310, the invention may also include a process of receiving product purchase history or digital content interaction data for the user and reassigning the user to one or more alternate collaborative user groups when the user's purchase history or content interaction data deviates from the collaborative user group. This process begins by continuously monitoring the user's product purchase history and digital content interaction data, which can be obtained through various channels, such as online browsing, transactions, or user feedback. As the user interacts with different products or content, their preferences may change, causing their purchase history or content interaction data to deviate from the patterns observed within their current collaborative user group.

When a deviation is detected, the invention may reassess the user's preferences and reassign the user to one or more alternate collaborative user groups that better match their current interests and behavior. This reassignment can be achieved using clustering algorithms or other similarity measures that compare the user's updated data to that of other users within the system. Once the user is reassigned to a new group or groups, the recommendation engine can generate more personalized and relevant product or content suggestions based on the preferences and behavior of the users in these new groups.

By dynamically reassigning users to different collaborative user groups when their preferences change, the invention can adapt to the evolving interests and needs of individual users. This flexibility allows the recommendation engine to maintain its effectiveness and accuracy, ensuring that users continue to receive meaningful and personalized recommendations even as their preferences shift over time. Finally, as indicated in block 312, the system may include dynamically altering digital content streamed to a user device of the user, wherein an implicit product placement module integrates recommended products within entertainment content as described herein using the hybrid recommendation engine.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for implicit item embedding within a simulated electronic environment, the system comprising:
    a processing device;
    a non-transitory storage device containing instructions when executed by the processing device, causes the processing device to perform the steps of:
    utilizing a hybrid recommendation engine to suggest product placements based on user data and user preferences of a user, wherein the hybrid recommendation engine comprises a content-based filtering component utilizing a utility matrix and a collaborative clustering component for user-based and product-based collaborative filtering, wherein the utility matrix is used to analyze the user data and the user preferences, and wherein the utility matrix is updated as additional data is gathered as to the user's product interests or product preferences;
    initiating a warm-up period for the user, wherein either the user-based or the product-based collaborative filtering is applied to assign the user to a collaborative user group until more information about the user is available;
    enhancing the hybrid recommendation engine via the collaborative clustering component comprising:
        assigning the user to the collaborative user group via user-based collaborative filtering of users based on their similar user characteristics, the product interests, or the product preferences; and
        product-based collaborative filtering for grouping products based on their similarity and relationships, further enhanced by analyzing complimentary and supplementary products as determined by one or more unsupervised machine learning engines;
    receiving digital content interaction data for the user and reassigning the user to one or more alternate collaborative user groups when the content interaction data deviates from the collaborative user group;
    execute object detection and localization using a you only look once convolutional neural network to identify a target object and a target object location for replacing pixels in digital content streamed to a user device of the user;
    dynamically altering the digital content streamed to the user device of the user, wherein an implicit product placement module integrates recommended products within entertainment content with a replacement of at least one original product in the entertainment content with the recommended products by replacing pixels associated with the at least one original product with pixels associated with the recommended products; and
    allowing third party access to the hybrid recommendation engine via an extension module with authorized application programming interface (API) access for digital file input.

2. The system of claim 1, wherein collaborative user groups are formed based on computed similarity scores, employing clustering techniques comprising k-means, hierarchical clustering, or density-based spatial clustering of applications with noise.

3. The system of claim 1, further comprising calculating a weighted average of preferences or ratings given by one or more users in the collaborative user group for an item, with the weights determined by a similarity between a specific user and other users in the collaborative user group.

4. The system of claim 1, further comprising a content-based filtering component utilizing a utility matrix used to analyze the user data and the user preferences, wherein the utility matrix is updated as additional data is gathered as to the user's product interests or product preferences.

5. The system of claim 4, wherein each entry in the utility matrix corresponds to a user-item pair and contains a score or rating that indicates the user's preference for that particular item.

6. The system of claim 1, further comprising creating one or more user categorizations based on the user's historical data, such as their browsing history, past purchases, or explicitly provided preferences.

7. A computer program product for implicit item embedding within a simulated electronic environment, the computer program product comprising a non-transitory computer-readable medium comprising code causing an apparatus to:
   utilize a hybrid recommendation engine to suggest product placements based on user data and user preferences of a user, wherein the hybrid recommendation engine comprises a content-based filtering component utilizing a utility matrix and a collaborative clustering component for user-based and product-based collaborative filtering, wherein the utility matrix is used to analyze the user data and the user preferences, and wherein the utility matrix is updated as additional data is gathered as to the user's product interests or product preferences;
   initiate a warm-up period for the user, wherein the user-based and the product-based collaborative filtering is applied to assign the user to a collaborative user group until more information about the user is available;
   enhance the hybrid recommendation engine via a collaborative clustering component, comprising:
      assigning the user to the collaborative user group via the user-based collaborative filtering of users based on their similar user characteristics, the product interests, or the product preferences; and
      product-based collaborative filtering for grouping products based on their similarity and relationships, further enhanced by analyzing complimentary and supplementary products as determined by one or more unsupervised machine learning engines;
   receive digital content interaction data for the user and reassigning the user to one or more alternate collaborative user groups when the content interaction data deviates from the collaborative user group;
   execute object detection and localization using a you only look once convolutional neural network to identify a target object and a target object location for replacing pixels in digital content streamed to a user device of the user
   dynamically alter the digital content streamed to the user device of the user, wherein an implicit product placement module integrates recommended products within entertainment content with a replacement of at least one original product in the entertainment content with the recommended products by replacing pixels associated with the at least one original product with pixels associated with the recommended products; and
   allow third party access to the hybrid recommendation engine via an extension module with authorized application programming interface (API) access for digital file input.

8. The computer program product of claim 7, wherein collaborative user groups are formed based on computed similarity scores, employing clustering techniques comprising k-means, hierarchical clustering, or density-based spatial clustering of applications with noise.

9. The computer program product of claim 7, further comprising calculating a weighted average of preferences or ratings given by one or more users in the collaborative user group for an item, with the weights determined by a similarity between a specific user and other users in the collaborative user group.

10. The computer program product of claim 7, further comprising a content-based filtering component utilizing a utility matrix used to analyze the user data and the user preferences, wherein the utility matrix is updated as additional data is gathered as to the user's product interests or product preferences.

11. The computer program product of claim 10, wherein each entry in the utility matrix corresponds to a user-item pair and contains a score or rating that indicates the user's preference for that particular item.

12. The computer program product of claim 7, further comprising creating one or more user categorizations based on the user's historical data, such as their browsing history, past purchases, or explicitly provided preferences.

13. A method for implicit item embedding within a simulated electronic environment, the method comprising:
   utilizing a hybrid recommendation engine to suggest product placements based on user data and user preferences of a user, wherein the hybrid recommendation engine comprises a content-based filtering component utilizing a utility matrix and a collaborative clustering component for user-based and product-based collaborative filtering, wherein the utility matrix is used to analyze the user data and the user preferences, and wherein the utility matrix is updated as additional data is gathered as to the user's product interests or product preferences;
   initiating a warm-up period for the user, wherein the user-based and the product-based collaborative filtering is applied to assign the user to a collaborative user group until more information about the user is available;
   enhancing the hybrid recommendation engine via the collaborative clustering component, comprising:
      assigning the user to the collaborative user group via user-based collaborative filtering of users based on their similar user characteristics, the product interests, or the product preferences; and
      product-based collaborative filtering for grouping products based on their similarity and relationships, further enhanced by analyzing complimentary and supplementary products as determined by one or more unsupervised machine learning engines;
   receiving digital content interaction data for the user and reassigning the user to one or more alternate collaborative user groups when the content interaction data deviates from the collaborative user group;
   executing object detection and localization using a you only look once convolutional neural network to identify a target object and a target object location for replacing pixels in digital content streamed to a user device of the user;

dynamically altering the digital content streamed to the user device of the user, wherein an implicit product placement module integrates recommended products within entertainment content with a replacement of at least one original product in the entertainment content with the recommended products by replacing pixels associated with the at least one original product with pixels associated with the recommended products; and allowing third party access to the hybrid recommendation engine via an extension module with authorized application programming interface (API) access for digital file input.

14. The method of claim 13, wherein collaborative user groups are formed based on computed similarity scores, employing clustering techniques comprising k-means, hierarchical clustering, or density-based spatial clustering of applications with noise.

15. The method of claim 13, wherein the method further comprises calculating a weighted average of preferences or ratings given by one or more users in the collaborative user group for an item, with the weights determined by a similarity between a specific user and other users in the collaborative user group.

16. The method of claim 13, wherein the method further comprises a content-based filtering component utilizing a utility matrix used to analyze the user data and the user preferences, wherein the utility matrix is updated as additional data is gathered as to the user's product interests or product preferences.

17. The method of claim 16, wherein each entry in the utility matrix corresponds to a user-item pair and contains a score or rating that indicates the user's preference for that particular item.

* * * * *